(12) United States Patent
Harneit

(10) Patent No.: US 6,293,272 B1
(45) Date of Patent: Sep. 25, 2001

(54) PORTABLE CABINET FOR AN OUTDOOR GAS GRILL

(76) Inventor: Uwe Harneit, 1466 W. Francis Ave., Ontario, CA (US) 91762-6016

(*) Notice: Subject to any disclaimer, the term of this patent is extended or adjusted under 35 U.S.C. 154(b) by 0 days.

(21) Appl. No.: 09/536,336

(22) Filed: Mar. 25, 2000

(51) Int. Cl.$^7$ .............................. A47J 37/00; F24C 15/08; F24C 15/16; F24C 3/00
(52) U.S. Cl. .................... 126/37 B; 126/37 R; 126/41 D; 126/41 R; 126/39 R; 126/39 B; 126/50; 126/268; 126/265; 99/467
(58) Field of Search ................................. 126/410, 37 R, 126/37 A, 39 R, 41 R, 268, 265, 266, 39 L, 39 B, 50; 99/467

(56) References Cited

U.S. PATENT DOCUMENTS

| | | |
|---|---|---|
| 732,470 * | 6/1903 | Tatham, Jr. . |
| 1,153,597 * | 9/1915 | Butler . |
| 2,027,124 * | 1/1936 | Stockstrom et al. ............... 126/41 D |
| 2,118,155 * | 5/1938 | Burch et al. . |
| 4,512,328 | 4/1985 | Arad . |
| 4,643,162 * | 2/1987 | Collins . |
| 4,886,045 | 12/1989 | Ducate, Jr. et al. . |
| 5,184,599 | 2/1993 | Stuart . |
| 5,263,467 * | 11/1993 | Jones ...................................... 126/42 |
| 5,891,498 | 4/1999 | Boehler . |
| 5,960,782 | 10/1999 | Clements et al. . |
| 6,000,389 * | 12/1999 | Alpert ................................. 126/25 R |
| 6,079,400 * | 6/2000 | Tomat Dany ....................... 126/37 B |

* cited by examiner

Primary Examiner—Carl D. Price
(74) Attorney, Agent, or Firm—Brande and McCleary; Lewis M. Brande; Thomas A. McCleary

(57) ABSTRACT

This invention describes a grill cabinet with a small footprint when stored. The cabinet holds at least one swing-out shelves that contains a cooking burner that can be used to cook warm foods, and at least one standard pull-out drawer which can hold cooking supplies or for preparing foods. A smoker oven can be added in the base of the cabinet. The cabinet has an area that can hold a small bottle of LP gas, valves and gas supply lines, as well as the smoker.

2 Claims, 2 Drawing Sheets

PORTABLE CABINET FOR AN OUTDOOR GAS GRILL

BACKGROUND OF THE INVENTION

1. Field of the Invention

Portable barbeques customarily are built with counters installed on the left, the right or both sides of the grill unit. These counters are primarily used to hold plates, condiments, etc. and also to prepare the food to be barbecued. Portable barbeques can have one or more side burners installed, so that sauces, soups, etc. can also be cooked on the side burners and kept warm.

A problem occurs when the side burners are installed into the side counters. The side burners use some of the surface area of the side counters. So the side counters are made larger in order to allow as little work space as possible on the counter to be lost. The result of making these counters larger is that the barbecues become wider and more demanding of space. The consumer is then faced with the prospect of having larger counters and/or additional side burners with an increase in overall storage area. This can be a disadvantage when housing the barbeque in limited space, such as on a balcony or patio.

A goal of the current invention is to minimize the footprint of the barbeque, while developing a barbecue that has both sufficient work space for food preparation, in addition to one or more side burners. This will allow consumers with limited storage space to recover most of the storage space used by the barbecue, when it is not being operated.

2. Description of the Prior Art

Grill cabinets are known in the prior art.

U.S. Pat. No. 5,960,782 by Clements et al. discloses an Outdoor Grill. The Outdoor grill has a space to place the propane tank, which is hinged within the cabinet. The heat is directed from a burner box to a cooking tray, where the tray is mounted on telescoping arms. There are major differences between the present invention and the disclosed invention. The present invention uses a portable grill that is not attached, but is positioned on the top of the cabinet. The portable grill is not a permanent attachment to the grill cabinet as is the disclosed invention, but is easily moveable from the top of the grill. The grill cabinet in the present invention is primarily used for storage of cooking utensils, spices and other implements. A secondary use of the cabinet is to house a burner which can be mounted on a swing out drawer as shown. Portability is another major difference between the two inventions.

U.S. Pat. No. 5,891,498 by Boehler, discloses a Barbeque grill smoker attachment. This invention is made to specifically attach to an outdoor grill. It uses the existing firebox of a portable gas grill to provide the necessary heat and smoke to "smoke" the food located in the smoker box.

U.S. Pat. No. 5,184,599 by Stuart discloses a multiple door/tray cooker, smoker and grill. The disclosed invention is circular in design and has doors with integrally mounted and adjustable grates. It allows easy access to the cooking food without disruption of the heat to other compartments, which are capable of varied cooking times and heats. The disclosed invention is mounted on a conventional grill structure that has leaves that provide surfaces to prepare food. The grill structure is open and has wheels on one side that allows for ease of movement. The grill structure is standard in construction and does not allow for storage in apartments and other places with limited storage space.

U.S. Pat. No. 4,886,045 by Ducate, Jr. et al. discloses a side burner attachment for a gas fired grill. It is made to be detachably mounted to a standard gas-fired grill. This is a structure that makes the grill larger and more difficult to store in space limited places.

SUMMARY OF THE INVENTION

The problem of minimizing the footprint, while adding the side-burners, was solved by installing a tray that slides outwards from the inside of a grill cabinet. The tray operates like a drawer and provides a stable platform to prepare the foods. An additional drawer or tray can be installed to swing open horizontally toward one side. This swinging tray can have one or more side-burners installed.

The operating valves and igniters for the side burner can also be installed in this tray. A gas supply line from the flammable gas source to the operating valve of the side-burner(s) can be a solid line or a flexible line. Between the valves and the side-burner(s), rigid tubing would be used.

If the operating valve is not installed on the swing-out tray/drawer, but in the cabinet, then the gas supply line from the valves to the side-burner can be made entirely from a flexible style of hose.

The swing-out tray which contains the side-burner(s) can have an upwardly drawn edge, similar to a drawer. This edge would also serve as a barrier to side wind, which could extinguish the side burner's flame, especially when operating at a low setting.

A smoking oven can additionally be added inside the grill cabinet. This smoking oven (or smoker) can work independently of the grill. If the smoker is fueled by gas, the supply lines for the gas can be run through a manifold that is attached either rigidly or flexibly to its operating valve.

Since both the grill and the smoker work independently of each other, the actual grill can be gas fueled and the smoking oven can operate on electric current (or vice versa). The cabinet can house a gas bottle (in case of fueling by liquefied petroleum gas). The cabinet also allows for additional storage, such as drawers, shelves, and/or hooks. The doors and sides of the cabinet can have louvers installed for ventilation, which would avoid any intrusion into the cabinet from fallen leaves in autumn or by water intrusion.

DETAILED DESCRIPTION

Figure 1:
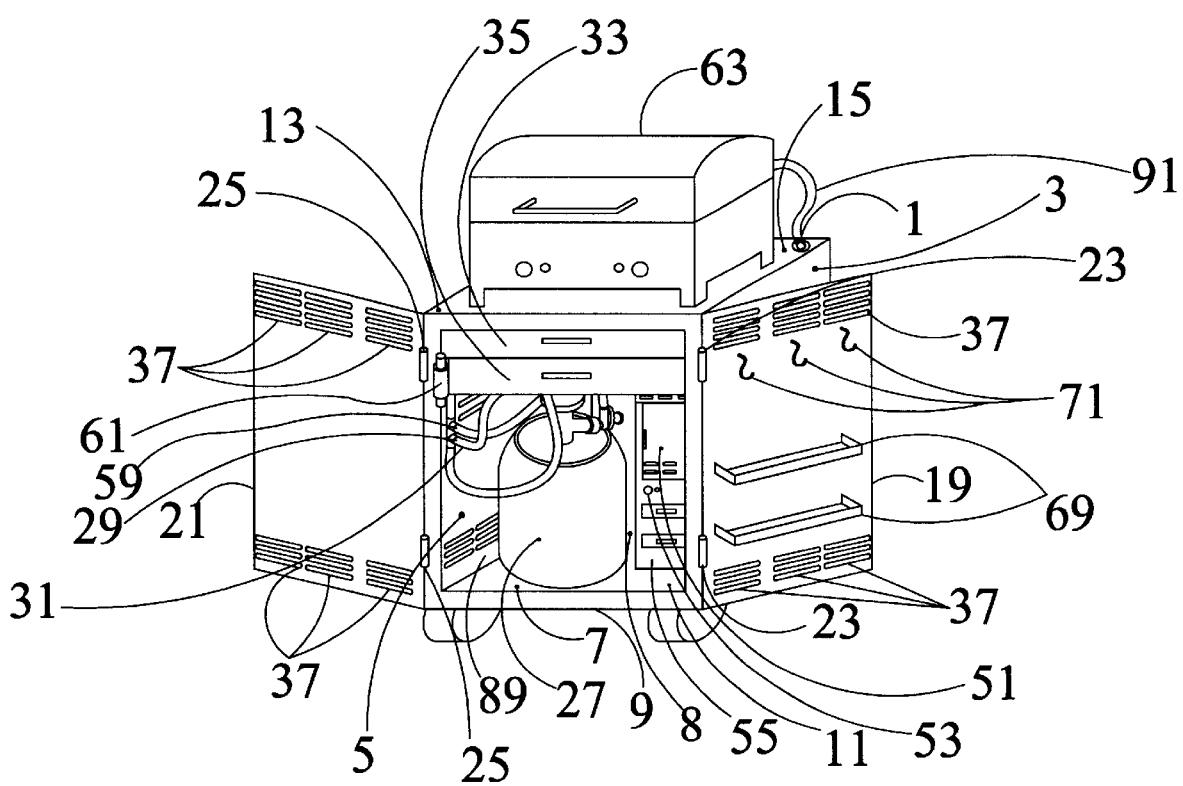
FIG. 1 shows a grill cabinet with a portable grill set on top of the cabinet. The cabinet doors are open and reveal two closed cabinet drawers, a smoker with two drawers and a liquid petroleum gas supply bottle, as well as gas supply lines going to the grill and side burners. One of the cabinet doors reveals storage hooks and storage shelves.
Figure 2:
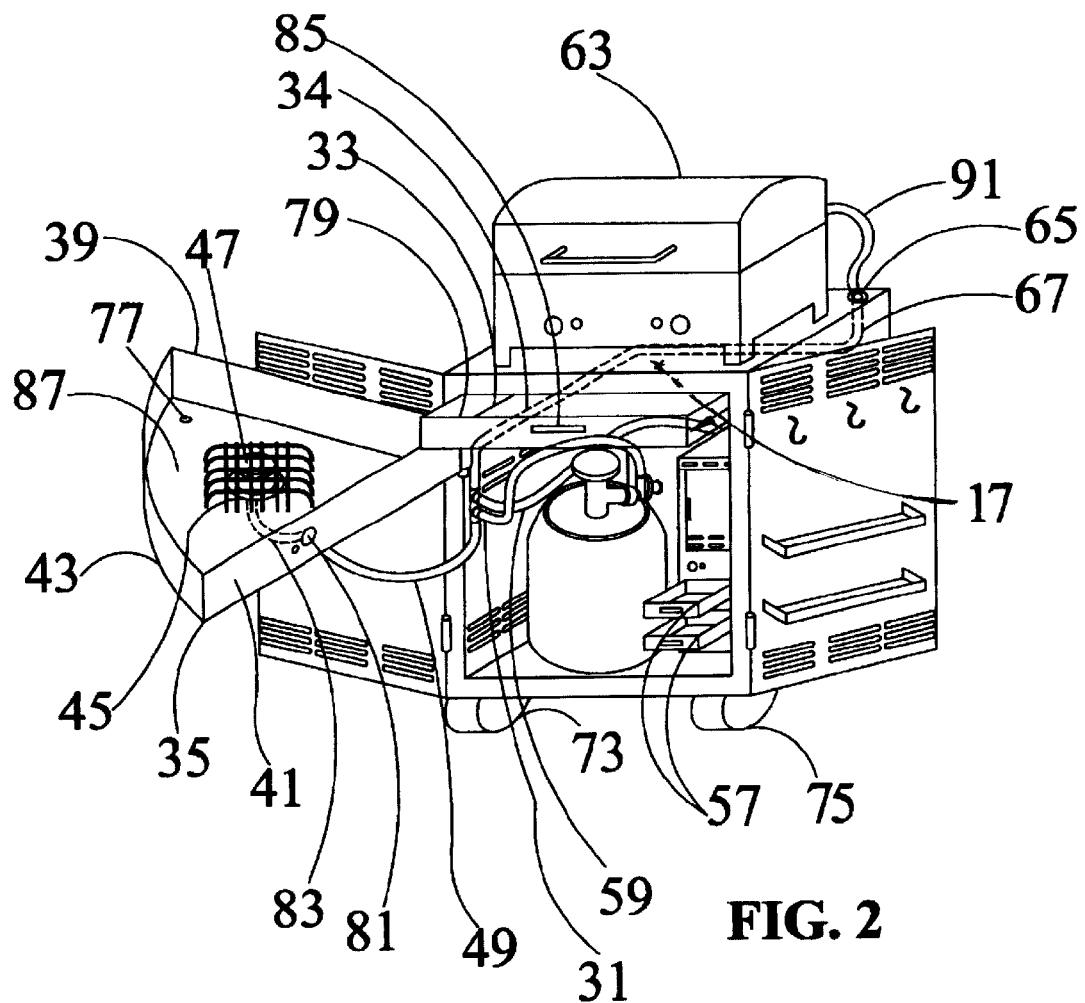
FIG. 2 shows the same grill cabinet with one of the cabinet drawers swung open, revealing swing-out drawer that has a side burner with an accompanying gas supply line installed. The second cabinet door is pulled out, similar to that in a chest of drawers. The two drawers mounted in the smoker oven are shown in the open position.

FIG. 1 depicts a portable grill cabinet (1). The grill cabinet (1) has a first side (3) and a second side (5) opposing the first side and both the first side (3) and the second side (5) being connected to a bottom (7) of the cabinet (1). A back wall (8) is attached to the bottom (7) and the first side (3) and the second side (5) of the grill cabinet (1). The bottom (7) has a lower surface (9) and an upper surface (11). A top (13) closes off the grill cabinet (1) and provides an opening on one side of the grill cabinet (1) allowing access to a cavity

(89) defined therein. The top (13) has an upper surface (15) and a lower surface (17). A first door (19) is hingeably attached to the first side (3) with at least 2 hinges (23). A second door (21) is hingeably attached to the second side (5) with at least 2 hinges (25). The first door and the second door are opened in opposite directions. The first door (19) has attached thereon a at least one storage shelf (69). Also mounted on the first door (19) are a plurality of storage hooks (71). Both the first door (19) and the second door (21) have louvers (37) to vent the grill cabinet (1) while preventing debris, water, etc. from entering the bottom of the grill cabinet (1).

Inside the portable grill cabinet (1) a smoker oven (51) is mounted therein. The smoker oven (51) has a temperature regulation system (53) to allow for proper temperature regulation of the smoker oven (51). The smoker oven (51) is mounted within a smoker cabinet (55).

The smoker cabinet (55) also has at least 2 drawers (57) for storage of miscellaneous cooking implements.

A small gas supply means (27) such as a 5 or 10 pound LP bottle is located inside the portable grill cabinet (1). A first gas supply line (31) is attached to the gas supply means (27) and provides flammable gas to a gas distribution manifold (29). A third gas supply line (59) is connected to the gas distribution manifold (29) and the smoker oven (51). The third gas supply line (59) provides flammable gas to the temperature regulation system (53) which is necessary to heat the smoker oven (51).

Slidably mounted below the top (13) of the grill cabinet (1) is a pullout drawer (33) where the pullout drawer (33) is mounted onto the grill cabinet (1) using standard telescoping drawer slides. The pullout drawer (33) has an upward edge (79). The drawer slides allow for a smooth slidable motion and also provide support for a tray (34) that is located inside the drawer (33). A handle (85) is attached to the pullout drawer (33) to allow for someone to easily grasp the and pull out the door. The handle (85) is attached to the pullout drawer (33) using conventional means.

Hingeably mounted just below the pullout drawer (33) is a swing out drawer (35). The swing out drawer (35) is hingeably attached to the second side (5) of the grill cabinet (1) using a hinge means (61). The swing out drawer (35) has a first edge (39), a second edge (41), and a third edge (43) mounted on the swing out drawer (35). The first edge (39), second edge (41), and the third edge (43) project upwards and are connected so as to create an open space or cavity (87) inside the swing out drawer (35). In addition, the swing out drawer (35) has a drainage hole (77) to allow any liquids such as grease or water to drain from the swing out drawer (35).

Centrally located in the swing out drawer (35) is a side burner (45). The side burner (45) has a grate (47) located above the side burner (45) which provides support for utensils in order to cook food. The side burner (45) is connected to a regulating system (81) with a fourth gas supply line (83). The regulating system (81) for the side burner (45) is connected to the gas distribution manifold (29) by a second gas supply line (49) and provides the necessary flammable gas to the side burner (45).

A portable gas grill (63) is loosely positioned on top (13) of the grill cabinet (1). The gas supply means (27) provides flammable gas to the portable gas grill (63) by means of a fifth gas supply line (67) which is attached to the gas distribution manifold (29) on one end, and a quick disconnect gas supply means (65) on an opposing end. The quick disconnect gas supply means (65) is mounted on the top (13) of the grill cabinet (1). A sixth gas supply line (91) connects the portable gas grill (63) to the quick disconnect gas supply means (65), providing flammable gas to the portable gas grill (63).

A first set of wheels (73) and a second set of wheels (75) are attached to the bottom (7) of the grill cabinet (1) to allow the cabinet to be moved to any location desired. The first set of wheels (73) and the second set of wheels (75) are positioned providing a parallelogram type of relationship therebetween.

What is claimed is:

1. A compact grill cabinet comprising:

a) a first side, a second side opposing said first side, a back wall said back wall connecting to said first side and said second side, a bottom, a top opposing said bottom of said grill cabinet and said bottom and said top each connecting to said first side, said second side, and said back wall creating a cavity therein;

b) a first door hingeably mounted to said first side of said grill cabinet, and a second door hingeably mounted to said second side of said grill cabinet, with said first door and said second door opening in opposing directions, with said first door having storage means mounted thereon;

c) a pull-out drawer, said pull-out drawer being located below said top of said grill cabinet and having a handle means to allow for easy pulling of said drawer, said pull out drawer being slidably mounted to said grill cabinet using telescoping drawer slides;

d) a swing-out drawer, said swing-out drawer being hingeably mounted to said second side of said grill cabinet using a hinge means, and being located below said pull-out drawer, said swing-out drawer having a handle mounted thereon, said handle allowing for easy grasping and movement of said swing-out drawer from said grill cabinet;

e) a gas supply means, said gas supply means providing flammable gas to a gas distribution manifold using a first gas supply line;

f) a side burner, said side burner being mounted in said swing-out drawer, said side burner being regulated with a temperature regulating means and being connected to said gas distribution manifold with a second gas supply line;

g) a quick disconnect gas supply means, said quick disconnect gas supply means attaching to said top of said grill cabinet, a fifth gas supply line, said fifth gas supply line having opposing ends, said fifth gas supply line attaching to said gas distribution manifold on one end and said quick disconnect gas supply means on said opposing end, allowing flammable gas to be transported from said gas distribution manifold to said quick disconnect gas supply means;

h) a first set of wheels, said first set of wheels being attached to said bottom of said grill cabinet, a second set of wheels, said second set of wheels being attached to said bottom of said grill cabinet and making a parallelogram type relationship with said first set of wheels providing stability for said grill cabinet;

i) a smoker oven, said smoker oven being located in said cavity in said grill cabinet and having a temperature regulating means to set cooking temperatures therein;

j) a third flexible gas supply line, said third flexible gas supply line being connected to said gas distribution manifold and to said smoker oven providing flammable gas thereto; and k) said smoker oven is housed in a smoker cabinet in said cavity in said grill cabinet, said smoker cabinet having a plurality of drawers, said drawers providing storage for cooking implements.

2. The compact grill cabinet as described in claim 1, further comprising:

a) a grate, said grate being located above said side burner and providing support for cooking utensils and food, said side burner being connected to said temperature regulating means with a fourth gas supply line providing flammable gas thereto; and b) said swing-out drawer having a drain hole defined therein to allow liquid and debris to be drained away from said side burner, said swing-out drawer having a first edge, a second edge, and a third edge, said first edge, said second edge and said third edge each projecting upwards and being connected, creating a cavity within said swing-out drawer, said cavity in said swing-out drawer providing protection from wind that could extinguish a flame on said side burner.

* * * * *